US012652415B2

(12) United States Patent
Hong et al.

(10) Patent No.: US 12,652,415 B2
(45) Date of Patent: Jun. 9, 2026

(54) PIXEL TRANSFORM METHOD FOR JPEG/MPEG COMPRESSION OF DOUBLE PHASE-AMPLITUDE CODED HOLOGRAMS

(71) Applicant: Korea Electronics Technology Institute, Seongnam-si (KR)

(72) Inventors: Ji Soo Hong, Seoul (KR); Byoung Hyo Lee, Seoul (KR); Sung Hee Hong, Seoul (KR); Young Min Kim, Seoul (KR); Jin Soo Jeong, Seoul (KR); Yong Hwa Kim, Seoul (KR); Hyeon Chan Oh, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 265 days.

(21) Appl. No.: 18/395,893

(22) Filed: Dec. 26, 2023

(65) Prior Publication Data

US 2025/0193442 A1     Jun. 12, 2025

(30) Foreign Application Priority Data

Dec. 11, 2023     (KR) ........................ 10-2023-0178620

(51) Int. Cl.
| | |
|---|---|
| *H04N 19/597* | (2014.01) |
| *G03H 1/08* | (2006.01) |
| *H04N 19/119* | (2014.01) |
| *H04N 19/136* | (2014.01) |
| *H04N 19/182* | (2014.01) |
| *H04N 19/62* | (2014.01) |

(52) U.S. Cl.
CPC ......... *H04N 19/597* (2014.11); *G03H 1/0841* (2013.01); *H04N 19/119* (2014.11); *H04N 19/136* (2014.11); *H04N 19/182* (2014.11);

*H04N 19/62* (2014.11); *G03H 2001/0858* (2013.01); *G03H 2226/02* (2013.01)

(58) Field of Classification Search
CPC ............... G03H 1/0808; G03H 1/0841; G03H 2001/0858; G03H 2226/02; H04N 19/119; H04N 19/136; H04N 19/182; H04N 19/597; H04N 19/06; H04N 19/62
USPC ......................................................... 382/233
See application file for complete search history.

(56) References Cited

PUBLICATIONS

Wang et al. "Joint neural phase retrieval and compression for energy- and computation-efficient holography on the edge" Jul. 2022, ACM Transactions on Graphics 41(4):1-16 (Year: 2022).*
(Continued)

*Primary Examiner* — Kenny A Cese
(74) *Attorney, Agent, or Firm* — NSIP Law

(57) ABSTRACT

There is provided a pixel transform method for JPEG/MPEG compression of double phase-amplitude coded holograms. According to an embodiment, a hologram compression method transforms a hologram represented by a complex number into a hologram represented only by a phase, rearranges pixels of the transformed hologram, and compresses the rearranged hologram. Pixels of a DPAC hologram are rearranged before the DPAC hologram is compressed in a standardized image/video compression technique, so that a high frequency component is prevented from occurring when a hologram is compressed. Accordingly, hologram quality degradation occurring when a DPAC hologram is used in a standardized image/video compression technique can be prevented.

17 Claims, 9 Drawing Sheets

Double phase-amplitude coding (DPAC)

(56)           References Cited

PUBLICATIONS

Yang et al."Wirtinger-derivatives-based tilted plane diffraction propagation for holographic near-eye displays" (Year: 2022).*

Jiao et al. "Compression of Phase-Only Holograms with JPEG Standard and Deep Learning", Holography, 3D Imaging and 3D Display (Year: 2018).*

Maimone et al. "Holographic Near-Eye Displays for Virtual and Augmented Reality", ACM Transactions on Graphics (TOG), vol. 36, Issue 4 (Year: 2017).*

Jiao, Shuming, et al., "Compression of Phase-Only Holograms with JPEG Standard and Deep Learning", Applied Sciences, 2018, (12 Pages in English).

Sui, Xiaomeng, et al., "Spatiotemporal Double-Phase Hologram for Complex-Amplitude Holographic Displays", Chinese Optics Letters, Oct. 2020, (4 Pages in English).

Korean Office Action Issued on Nov. 29, 2024, in Counterpart Korean Patent Application No. 10-2023-0178620 (2 Pages in English, 5 Pages in Korean).

* cited by examiner

Double phase-amplitude coding (DPAC)

$$Ae^{-i\emptyset} = \frac{1}{2}e^{-i\emptyset_1} + \frac{1}{2}e^{-i\emptyset_2}$$

$$\emptyset_1 = \emptyset + \cos^{-1}A$$
$$\emptyset_2 = \emptyset - \cos^{-1}A$$

Principle of double phase-amplitude coding

DPAC pixel
Transform (DPT)

DPAC hologram

Transformed
DPAC hologram

DPT

1

PIXEL TRANSFORM METHOD FOR JPEG/MPEG COMPRESSION OF DOUBLE PHASE-AMPLITUDE CODED HOLOGRAMS

CROSS-REFERENCE TO RELATED APPLICATION(S) AND CLAIM OF PRIORITY

This application is based on and claims priority under 35 U.S.C. § 119 to Korean Patent Application No. 10-2023-0178620, filed on Dec. 11, 2023, in the Korean Intellectual Property Office, the disclosure of which is herein incorporated by reference in its entirety.

BACKGROUND

Field

The disclosure relates to a hologram transform method, and more particularly, to a hologram pixel transform method for enhancing JPEG/MPEG compression performance of a double phase-amplitude coding (DPAC) hologram.

Description of Related Art

According to a standardized JPEG/MPEG compression method, which is used in image and video compression, compression is performed to reduce a high frequency component after applying discrete cosine transform (DCT).

DPAC uses two adjacent pixels as one pixel and arranges pixels in a checkerboard pattern in order to represent hologram information represented by a complex number (phase+amplitude) only with phase information. The checkerboard pattern arrangement constitutes a hologram image of a high frequency, and accordingly, when a standard image compression technology for reducing a high frequency component through DCT is applied, performance of a double phase hologram is degraded.

For hologram compression, JPEG Pleno Holography standardization is ongoing in JPEG (ISO/IEC JTC1 SC29 WG1). However, this standardization is performed for random phase holograms, and does not deal with double phase-amplitude coding holograms based on smooth phase holograms. In addition, standardization is still ongoing and there is a restriction on applying to and using for various commercial tools and platforms.

Compression methods using deep learning are being researched. These methods have the advantage of high performance for DPAC holograms, but require high-performance graphic processing units (GPUs) and thus availability is reduced. In addition, much time is required to calculate through a network and thus there is a restriction on real-time video compression.

SUMMARY

The disclosure has been developed in order to solve the above-described problems, and an object of the disclosure is to provide, as a solution for preventing hologram quality degradation occurring when DPAC holograms are applied to a standardized image/video compression technique, a method for compressing by rearranging pixels of a DPAC hologram.

According to an embodiment of the disclosure to achieve the above-described object, a hologram compression method may include: a step of transforming a hologram represented by a complex number into a hologram represented only by a phase; a step of rearranging pixels of the transformed hologram; and a step of compressing the rearranged hologram.

The step of transforming may include transforming the hologram represented by the complex number into a sum of two phase maps, dividing each phase map on a pixel basis, and arranging pixels in a checkerboard pattern not to neighbor one another.

The step of transforming may include transforming the hologram by applying double phase-amplitude coding (DAPC).

The step of rearranging may include rearranging pixels to reduce a high frequency component when the hologram is compressed.

The step of rearranging may include rearranging pixels such that pixels divided on the same phase map neighbor one another.

The step of rearranging may include dividing the hologram into a plurality of areas and rearranging pixels divided on the same phase map in the divided areas.

The step of rearranging may include sorting and rearranging the pixels divided on the same phase map, based on arranged rows or columns.

According to the disclosure, the hologram compression method may further include: a step of reconstructing the compressed hologram by decompressing; and a step of inversely rearranging pixels of the decompressed hologram.

The step of compressing may include compressing the rearranged hologram according to JPEG standards or MPEG standards.

According to another aspect of the disclosure, there is provided a hologram compression system including: a processor configured to transform a hologram represented by a complex number into a hologram represented only by a phase, to rearrange pixels of the transformed hologram, and to compress the rearranged hologram; and a storage unit configured to provide a necessary storage space to the processor.

According to still another aspect of the disclosure, there is provided a hologram reconstruction method including: a step of decompressing a hologram which is compressed by transforming a hologram represented by a complex number into a hologram represented only by a phase and then rearranging pixels; and a step of inversely rearranging pixels of the decompressed hologram.

According to yet another aspect of the disclosure, there is provided a hologram reconstruction system including: a processor configured to decompress a hologram which is compressed by transforming a hologram represented by a complex number into a hologram represented only by a phase and then rearranging pixels, and to inversely rearrange pixels of the decompressed hologram; and a storage unit configured to provide a necessary storage space to the processor.

As described above, according to embodiments of the disclosure, pixels of a DPAC hologram are rearranged before the DPAC hologram is compressed in a standardized image/video compression technique, so that a high frequency component is prevented from occurring when a hologram is compressed. Accordingly, hologram quality degradation occurring when a DPAC hologram is used in a standardized image/video compression technique can be prevented.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used through-out this patent document: the terms "include" and "com-prise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communi-cable with, cooperate with, interleave, juxtapose, be proxi-mate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclo-sure and its advantages, reference is now made to the following description taken in conjunction with the accom-panying drawings, in which like reference numerals repre-sent like parts.

DETAILED DESCRIPTION

Hereinafter, the disclosure will be described in more detail with reference to the accompanying drawings.

Embodiments of the disclosure provide a method for compressing by rearranging pixels of a double phase-am-plitude coding (DPAC) hologram. The disclosure relates to a technology for rearranging pixels of a DPAC hologram to prevent a high frequency component from occurring during compression, prior to compressing the DPAC hologram in a standardized image/video compression technique.

Figure 1:
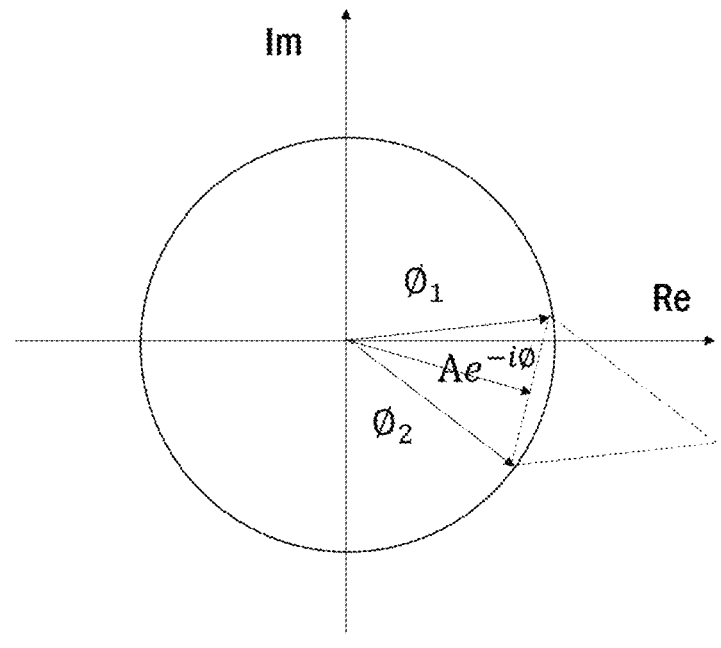
FIG. 1 is a view illustrating a DPAC algorithm to which an embodiment of the disclosure is applicable.
Figure 2:
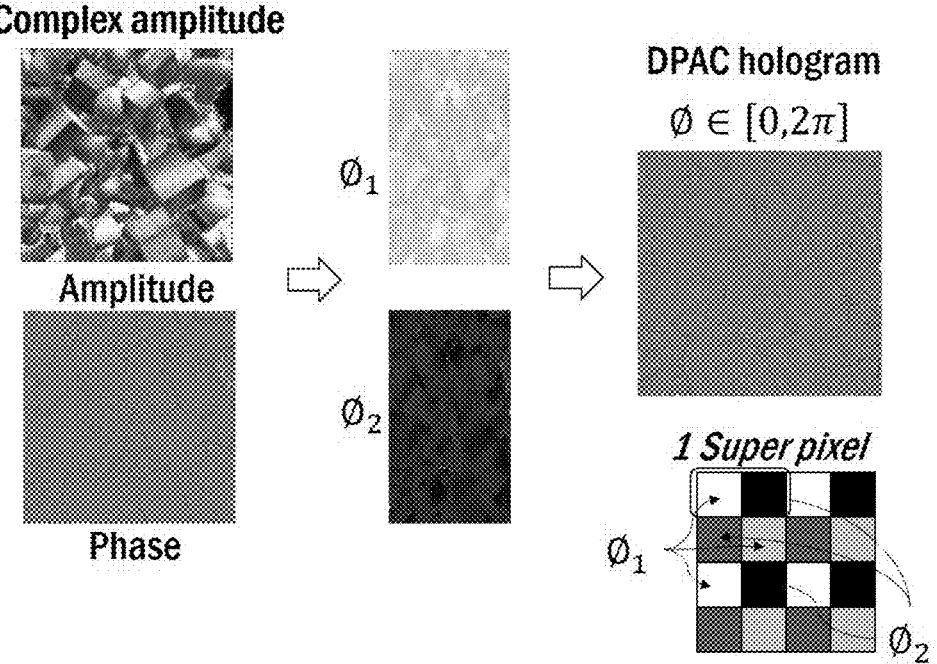
FIG. 2 is a view illustrating a DPAC algorithm to which an embodiment of the disclosure is applicable.

FIG. 1 is a view illustrating a DPAC algorithm to which an embodiment of the disclosure is applicable, and FIG. 2 is a view illustrating a DPAC algorithm to which an embodi-ment of the disclosure is applicable. DPAC is an algorithm for transforming hologram information represented by a complex number into a hologram represented only by phase information. A DPAC hologram may be obtained by trans-forming a hologram represented by a complex number into a sum of two phase maps ($\Phi_1$, $\Phi_2$) through the equation shown in FIG. 1, and dividing the respective phase maps ($\Phi_1$, $\Phi_2$) on a pixel basis and arranging pixels in a check-erboard pattern not to neighbor each other as shown in FIG. 2.

Figure 3:
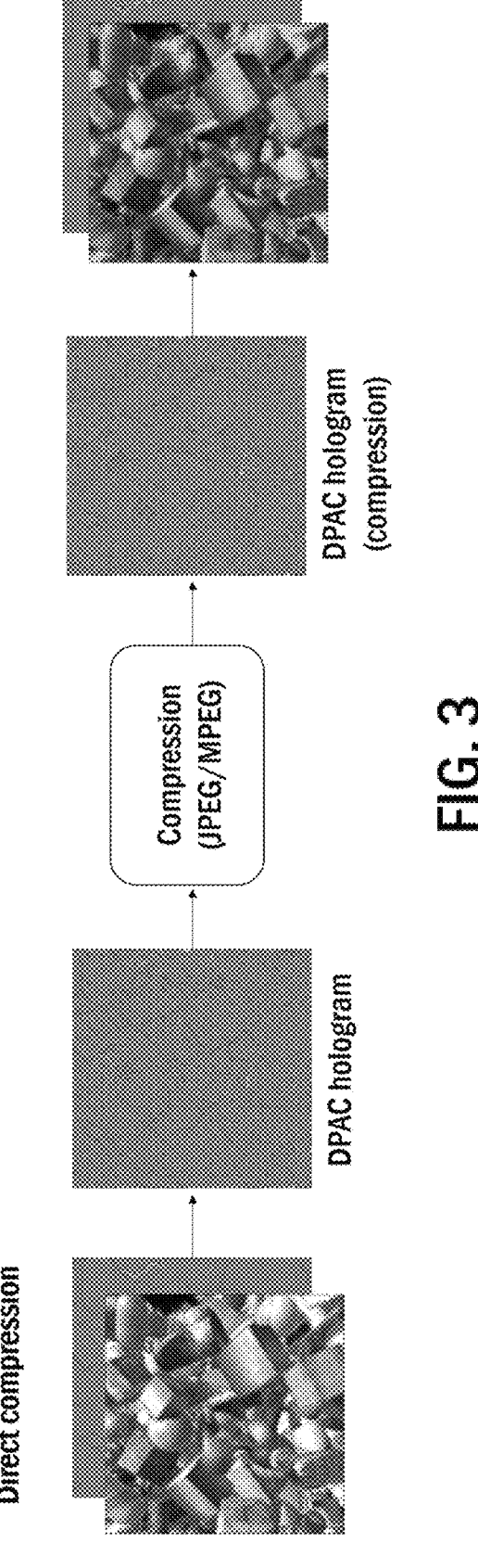
FIG. 3 is a view illustrating JPEG standard compression of a DPAC hologram.
Figure 4:
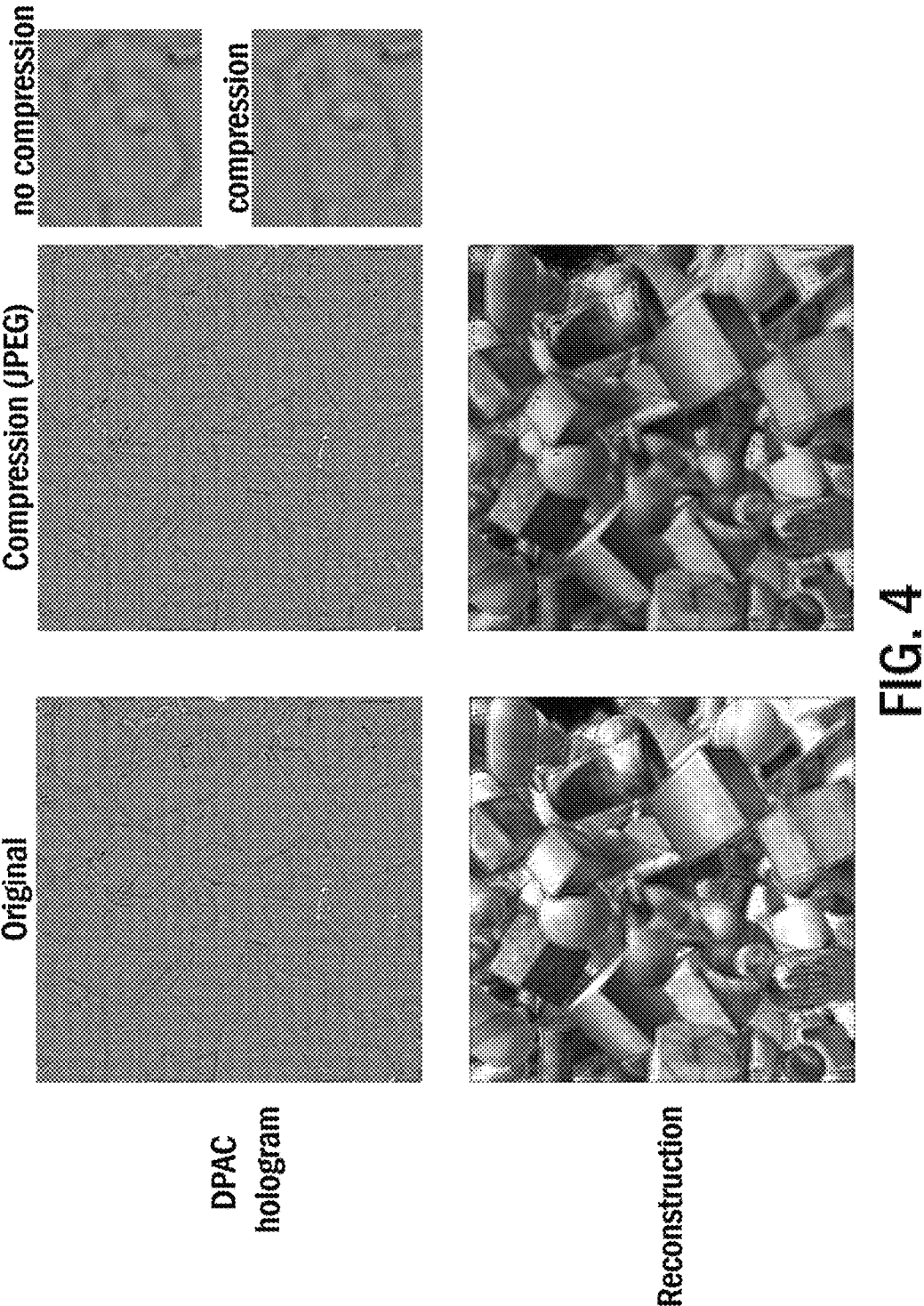
FIG. 4 is a view illustrating JPEG standard compression of a DPAC hologram.

FIG. 3 illustrates an example of directly applying JPEG standard compression to a DPAC hologram. As shown in FIG. 3, when JPEG compression is directly applied to a DPAC hologram, it appears that there is no big difference between the original hologram image and a compressed hologram image. However, referring to a result of recon-structing the compressed hologram to numerically show how the compressed hologram is viewed on a 3D space, it may be identified that color data is lost in the reconstructed compressed hologram as shown in FIG. 4.

Figure 5:
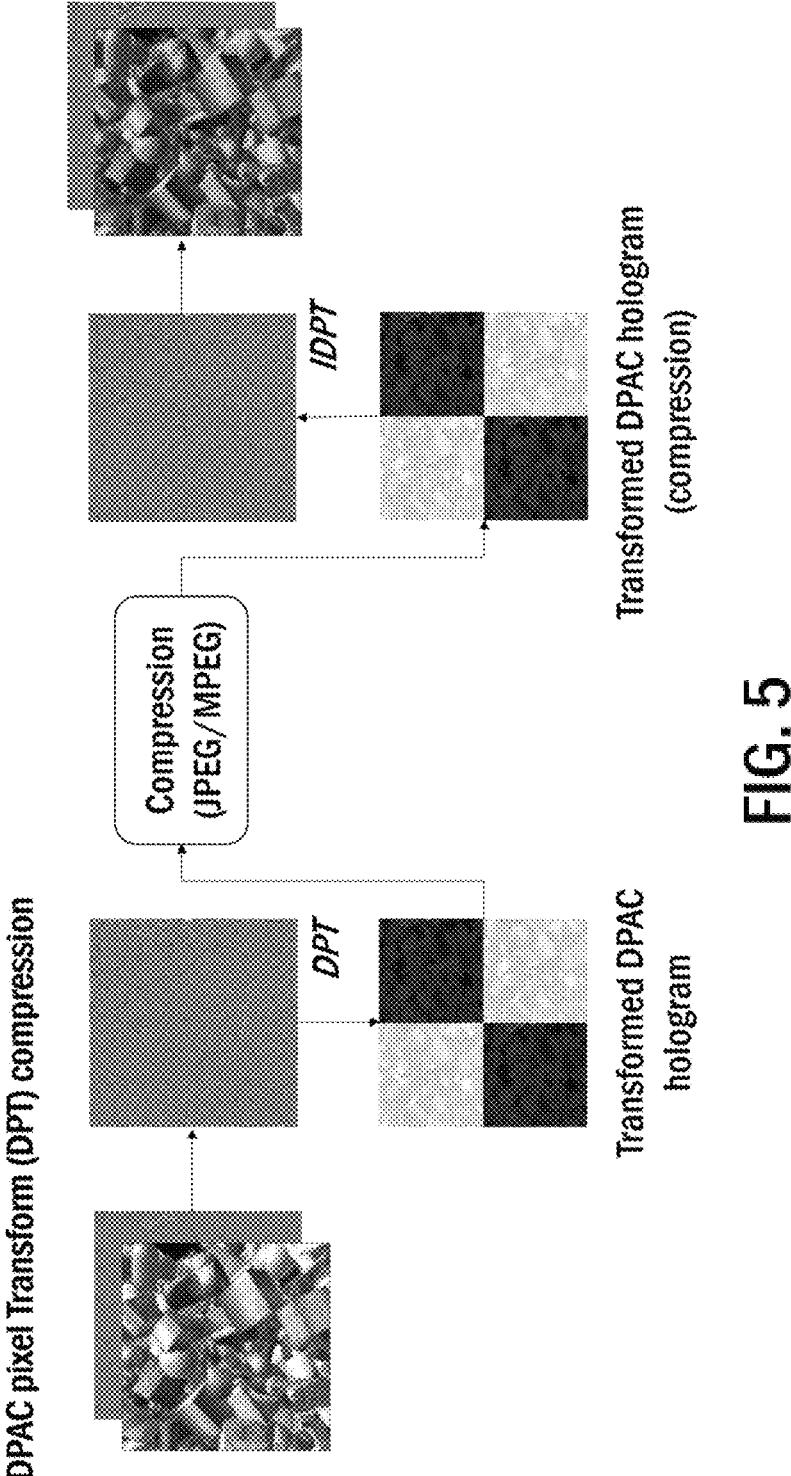
FIG. 5 is a view illustrating a hologram compression method applying DPAC pixel transform (DPT) and a holo-gram reconstruction method applying inverse DPT (IDPT) according to an embodiment of the disclosure.

FIG. 5 is a view illustrating a hologram compression method applying DPAC pixel transform (DPT) and a holo-gram reproduction method applying inverse DPT (IDPT).

In order to compress a hologram, DPT is performed prior to compressing a DPAC hologram as shown on the left side of FIG. 5. That is, DPT is performed on the DPAC hologram and then JPEG standard compression or MEPG standard compression is performed. DPT will be described in detail with reference to FIG. 6.

In order to reconstruct a compressed hologram, IDPT is performed after a DPAC hologram is decompressed as shown on the right side of FIG. 5. IDPT will be described in detail with reference to FIG. 7.

Figure 6:
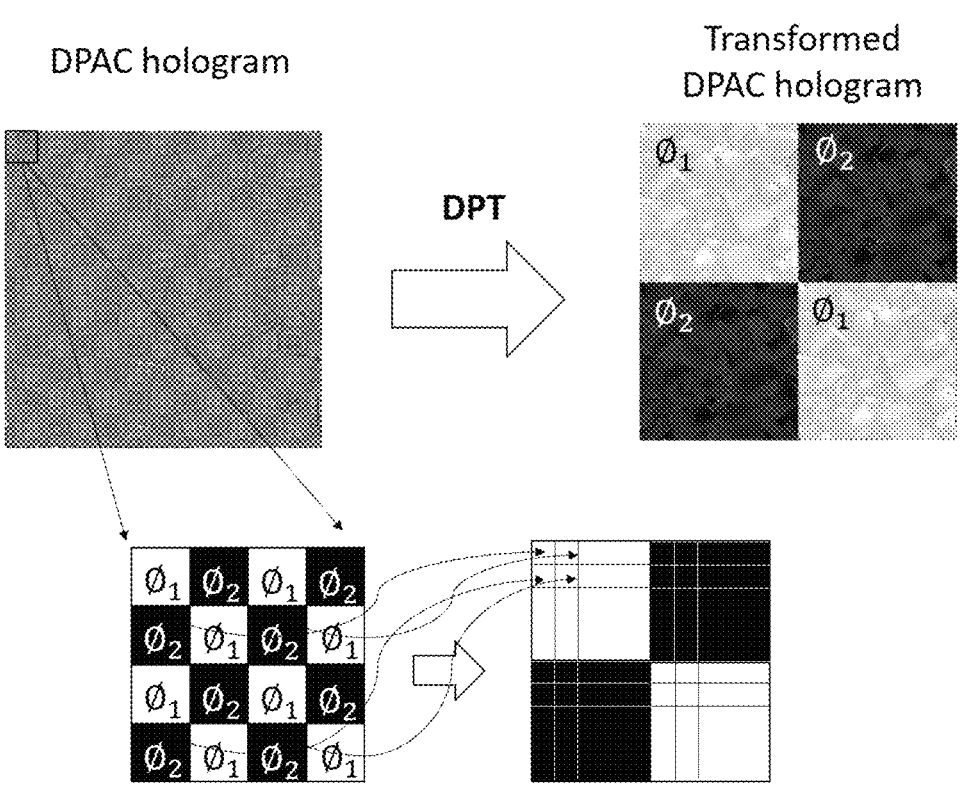
FIG. 6 is a view illustrating a DPT process.

FIG. 6 is a view illustrating a DPT process. DPT is rearranging pixels to reduce a high frequency component when a DPAC hologram is compressed. Specifically, in DPT, pixels are rearranged such that pixels divided on the same phase map neighbor one another.

Specifically, pixels of a phase map $\Phi_1$ and pixels of a phase map $\Phi_2$ which are alternately arranged in a checker-board pattern are rearranged as shown in the lower portion of FIG. 6, such that pixels of $\Phi_1$ neighbor one another and pixels of $\Phi_2$ neighbor one another.

In FIG. 6, pixels of the DPAC hologram are rearranged in four divided areas. That is, 1) pixels in the odd-numbered column among the pixels of $\Phi_1$ are rearranged in an upper area of the left side of the DPAC hologram, 2) pixels in the odd-numbered column among the pixels of $\Phi_2$ are rear-ranged in a lower area of the left side of the DPAC hologram, 3) pixels in the even-numbered column among the pixels of $\Phi_2$ are rearranged in an upper area of the right side of the DPAC hologram, and 4) pixels in the even-numbered col-umn among the pixels of $\Phi_1$ are rearranged in a lower area of the right side of the DPAC hologram.

However, the above-described rearrangement method is merely an example and a change may be made thereto. For example, pixels may be divided into two divided areas, such that pixels of $\Phi_1$ are rearranged in the left area and pixels of $\Phi_2$ are rearranged in the right area, or pixels of $\Phi_1$ are rearranged in the upper area and pixels of $\Phi_2$ are rearranged in the lower area.

Furthermore, pixels may be divided into 8 divided areas or 16 divided areas. In this case, the technical ideal of the disclosure may be applied.

Figure 7:
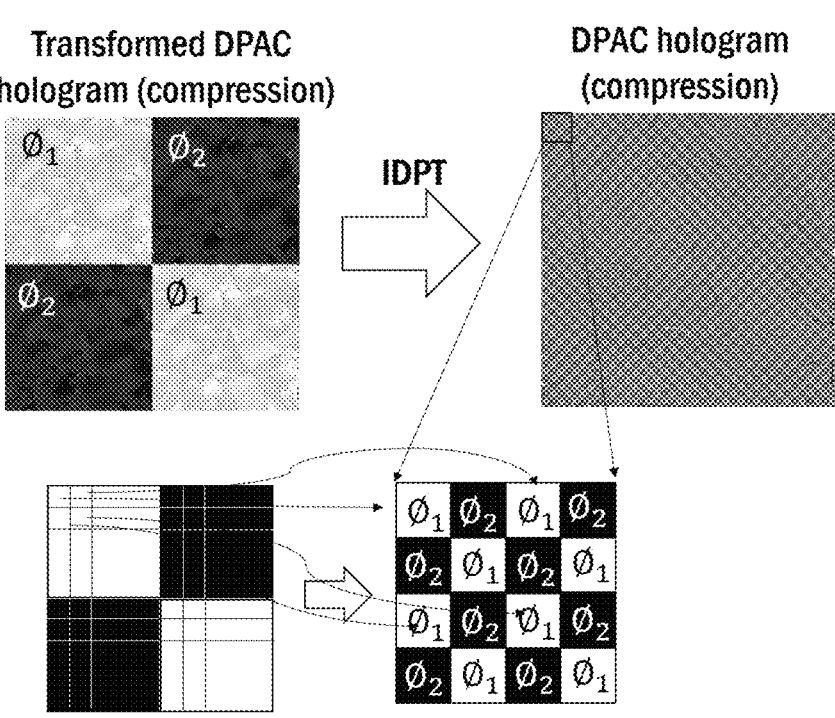
FIG. 7 is a view illustrating an IDPT process.

FIG. 7 is a view illustrating an IDPT process. As shown in FIG. 7, IDPT is a process of arranging pixels of $\Phi_1$ and pixels of $\Phi_2$ alternately in a checkerboard pattern by inversely rearranging pixels in the opposite way to the re-arrangement according to DPT in FIG. 6.

Figure 8:
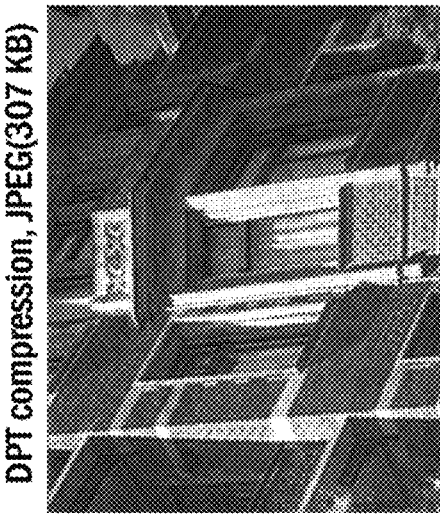
FIG. 8 is a view illustrating a result of an optical experi-ment regarding a hologram compression method according to an embodiment of the disclosure.
Figure 8:
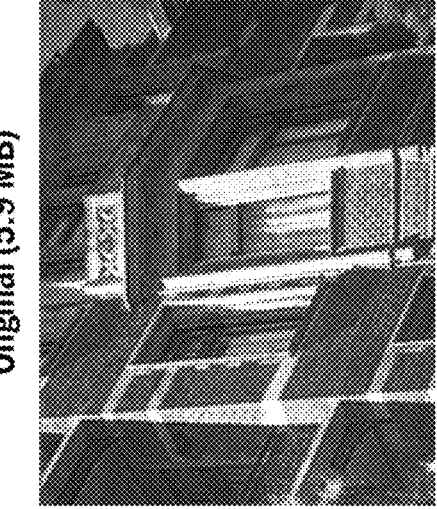

FIG. 8 illustrates a result of an optical experiment regard-ing a hologram compression method according to an embodiment of the disclosure. FIG. 8 illustrates a result of reconstructing an original hologram (1K resolution, 5.9 MB) for which JPEG compression has been directly performed, and a result of reconstructing a hologram that has been compressed after applying DPT according to an embodiment of the disclosure. It can be identified that color data which is lost when JPEG compression is directly applied to a hologram in a related-art method is preserved and compression performance is enhanced.

Figure 9:
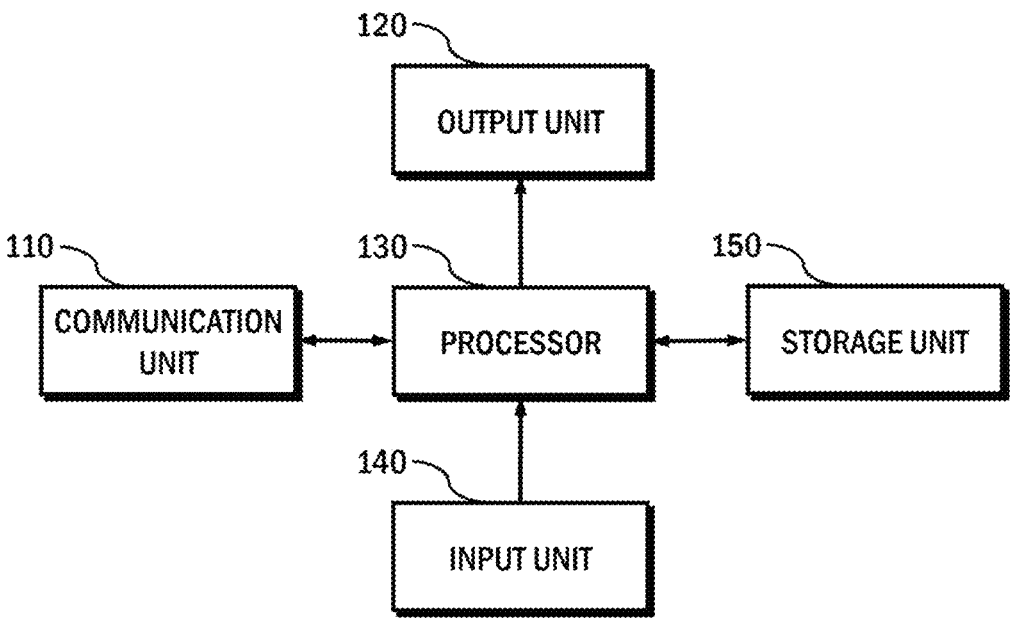
FIG. 9 is a view illustrating a hologram compression/reconstruction system according to another embodiment of the disclosure.

FIG. 9 is a view illustrating a configuration of a hologram compression/reconstruction system according to another embodiment of the disclosure. As shown in FIG. 9, the hologram compression/reconstruction system according to another embodiment may be implemented by a computing system including a communication unit 110, an output unit 120, a processor 130, an input unit 140, and a storage unit 150.

The communication unit 110 is a communication interface for connecting to an external network or an external device, and transmits and receives a hologram to be compressed or to be reconstructed. The output unit 120 is an output means for displaying a result of computing by the processor 130, and the input unit 140 is a user interface for receiving a user command and transmitting a user command to the processor 130.

The processor 130 compresses a hologram or reconstructs a compressed hologram according to the procedure shown in FIG. 5. The storage unit 150 provides a storage space necessary for functions and operations of the processor 130.

Up to now, a hologram compression method applying DPT and a hologram reconstruction method applying IDPT have been described in detail with reference to preferred embodiments.

In the above-described embodiments, pixels of a DPAC hologram are rearranged before the DPAC hologram is compressed in a standardized image/video compression technique, so that a high frequency component is prevented from occurring when a hologram is compressed.

Accordingly, a high frequency component of the DPAC hologram is transformed into a low frequency, so that loss of high frequency information occurring in related-art DCT-based compression can be avoided, and color quality degradation of the DPAC hologram occurring in a related-art compression process can be prevented.

The compression method and the reconstruction method described above may be applied to various commercial tools and platforms, and may be used in various applications such as streaming, and compression and reconstruction processes may be performed in real time.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A hologram compression method comprising:
transforming a hologram represented by a complex number into a double phase-amplitude coded (DPAC) hologram represented only by a phase;
performing a DPAC pixel transform (DPT) prior to compressing the DPAC hologram, including rearranging pixels of the DPAC hologram using the DPT to reduce a high frequency component when the DPAC hologram is compressed; and
compressing the rearranged DPAC hologram.

2. The hologram compression method of claim 1, wherein the transforming comprises transforming the hologram represented by the complex number into a sum of two phase maps, dividing each phase map on a pixel basis, and arranging pixels in a checkerboard pattern not to neighbor one another.

3. The hologram compression method of claim 2, wherein the transforming comprises transforming the hologram by applying the DPAC.

4. The hologram compression method of claim 1, wherein the rearranging comprises rearranging pixels such that pixels divided on a same phase map neighbor one another.

5. The hologram compression method of claim 4, wherein the rearranging comprises dividing the hologram into a plurality of areas and rearranging pixels divided on the same phase map in the divided areas.

6. The hologram compression method of claim 5, wherein the rearranging comprises sorting and rearranging the pixels divided on the same phase map, based on arranged rows or columns.

7. The hologram compression method of claim 1, further comprising:
reconstructing the compressed hologram by decompressing; and
inversely rearranging pixels of the decompressed hologram to reverse the rearranging of pixels of the DPAC hologram using the DPT.

8. The hologram compression method of claim 1, wherein the compressing comprises compressing the rearranged DPAC hologram according to JPEG standards or MPEG standards.

9. A hologram compression system comprising:
a processor configured to transform a hologram represented by a complex number into a double phase-amplitude coded (DPAC) hologram represented only by a phase, to perform a DPAC pixel transform (DPT) prior to compressing the DPAC hologram, including rearranging pixels of the DPAC hologram using the DPT to reduce a high frequency component when the DPAC hologram is compressed, and to compress the rearranged DPAC hologram; and
a storage unit configured to provide a necessary storage space to the processor.

10. The system of claim 9, wherein, for the transforming, the processor is configured to transform the hologram represented by the complex number into a sum of two phase maps, divide each phase map on a pixel basis, and arrange pixels in a checkerboard pattern not to neighbor one another.

11. The system of claim 10, wherein, for the transforming, the processor is configured to transform the hologram by applying the DPAC.

12. The system of claim 9, wherein, for the rearranging, the processor is configured to rearrange pixels such that pixels divided on a same phase map neighbor one another.

13. The system of claim 12, wherein, for the rearranging, the processor is configured to divide the hologram into a plurality of areas and rearrange pixels divided on the same phase map in the divided areas.

14. The system of claim 13, wherein, for the rearranging, the processor is configured to sort and rearrange the pixels divided on the same phase map, based on arranged rows or columns.

15. The system of claim 9, wherein the processor is further configured to reconstruct the compressed hologram by decompressing; and inversely rearrange pixels of the decompressed hologram to reverse the rearranging of pixels of the DPAC hologram using the DPT.

16. The system of claim 9, wherein, for the compressing, the processor is configured to compress the rearranged DPAC hologram according to JPEG standards or MPEG standards.

17. A hologram reconstruction method comprising:

decompressing a compressed hologram; and inversely rearranging pixels of the decompressed hologram to reverse the rearranging of pixels of a double phase-amplitude coded (DPAC) hologram using a DPAC pixel transform (DPT), wherein the compressed hologram is generated based on results of:

transforming a hologram represented by a complex number into a double phase-amplitude coded (DPAC) hologram represented only by a phase;

performing the DPT prior to compressing the DPAC hologram, including rearranging pixels of the DPAC hologram using the DPT to reduce a high frequency component when the DPAC hologram is compressed; and compressing the rearranged DPAC hologram on which the DPT is performed.

* * * * *